United States Patent
Sell et al.

(10) Patent No.: US 11,713,812 B2
(45) Date of Patent: Aug. 1, 2023

(54) CENTRIFUGAL HYDRAULIC SEAL

(71) Applicant: SYNCRUDE CANADA LTD. in trust for the owners of the Syncrude Project as such owners exist now and in the future, Calgary (CA)

(72) Inventors: Andrew G. Sell, Fort McMurray (CA); Jason P. Kachur, Fort McMurray (CA)

(73) Assignee: Syncrude Canada Ltd., Calgary (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 17/495,090

(22) Filed: Oct. 6, 2021

(65) Prior Publication Data
US 2022/0107023 A1    Apr. 7, 2022

Related U.S. Application Data (60) Provisional application No. 63/088,254, filed on Oct. 6, 2020.

(51) Int. Cl.
| | | |
|---|---|---|
| *F16J 15/42* | (2006.01) | |
| *F16J 15/3268* | (2016.01) | |
| *F16J 15/3284* | (2016.01) | |

(52) U.S. Cl.
CPC .......... *F16J 15/42* (2013.01); *F16J 15/3268* (2013.01); *F16J 15/3284* (2013.01)

(58) Field of Classification Search
CPC ...... F16J 15/42; F16J 15/3268; F16J 15/3284; F16J 15/40; F16J 15/447; F16J 15/4472; F16J 15/4474; F16J 15/4476; F16J 15/4478
See application file for complete search history.

(56) References Cited

U.S. PATENT DOCUMENTS

| | | | | |
|---|---|---|---|---|
| 2,936,715 A | | 5/1960 | Southam et al. | |
| 3,765,688 A | * | 10/1973 | Junker | F16J 15/42 |
| | | | | 277/428 |
| 4,570,947 A | * | 2/1986 | Smith | F16C 33/763 |
| | | | | 277/428 |
| 2021/0102528 A1 | * | 4/2021 | Christoffersen | F16J 15/40 |

FOREIGN PATENT DOCUMENTS

| | | | | | |
|---|---|---|---|---|---|
| EP | 3425243 A1 | * | 1/2019 | ........... | B63H 23/321 |
| GB | 2125118 A | * | 2/1984 | ............... | F16J 15/42 |

* cited by examiner

*Primary Examiner* — Gilbert Y Lee
(74) *Attorney, Agent, or Firm* — Bennett Jones LLP (57) ABSTRACT

A centrifugal hydraulic seal between the rotating and non-rotating components of rotating process equipment is provided. The centrifugal hydraulic seal reduces toxic gases inside an operating machine from escaping to the atmosphere or reduces gas from the atmosphere entering into the operating machine by the placement of protruding vanes on the face of the rotating seal wall on the low pressure side of the seal.

20 Claims, 6 Drawing Sheets

CENTRIFUGAL HYDRAULIC SEAL

The present invention relates generally to a hydraulic sealing assembly for rotating process equipment, and more particularly to a sealing assembly to provide a liquid gas seal between rotating and non-rotating parts.

BACKGROUND OF THE INVENTION

Rotating process equipment typically includes equipment like gas turbines, steam turbines, and other expanders; turbo-pumps and compressors; fans; motors; and centrifuges. These equipment all use rotary motion to perform work with rotors, impellers, blades, or other attachments. To ensure that process gases/liquids do not leak into the atmosphere, or that non-process gases/liquids (e.g. atmospheric gases) do not contaminate the process, a seal between the rotating and non-rotating parts is required.

Many technologies can provide a seal, however, large equipment with high axial & radial displacements, such as found in decanter centrifuges, provide a unique sealing challenge often solved with centrifugal hydraulic seals. Centrifugal hydraulic seals use water (or other sealing liquid) and centrifugal force. Water is continuously added to a rotating seal element; due to the centrifugal force, the water builds up a barrier around a stationary baffle to provide a seal between atmospheric and process environments.

The current commercially available centrifugal hydraulic sealing capacity is limited to the rotational velocity of the liquid pool and sensitive to variations in internal process pressure. This causes frequent operability challenges, which include sealing fluid leaks, uncertainty in sealing fluid replenishment requirements, and process gas leaks.

There is a need in the industry for a sealing device for any type of rotating process equipment that addresses present seal design limitations.

SUMMARY OF THE INVENTION

The present invention is directed to providing a centrifugal hydraulic seal between the rotating and non-rotating components of rotating process equipment. The hydraulic seal of the present invention reduces toxic gases inside an operating machine from escaping to the atmosphere or reduces gas from the atmosphere entering into the operating machine. It works because the machine imparts centrifugal force on the fluid inside the rotating chamber of the seal.

In particular, the hydraulic sealing assembly of the present invention comprises placement of protruding vanes on the face of the rotating seal wall on the low pressure side of the seal. By doing so, the performance (sealing capability) of the sealing assembly was improved.

In one aspect, a hydraulic sealing assembly is provided for providing a liquid gas seal between a rotating part and a non-rotating part within rotating process equipment, comprising:
- a seal housing having an atmospheric cover and a process cover, containing:
  - a rotating chamber attached to the rotating part, the rotating chamber having an inner atmospheric wall and an inner process wall and forming a fluid container for receiving a hydraulic sealing fluid;
  - at least one protruding vane attached to the inner atmospheric wall of the rotating chamber to prevent escape of gases from the rotating process equipment to atmosphere or at least one protruding vane attached to the inner process wall of the rotating chamber to prevent atmospheric gases from entering the rotating process equipment; and
  - a stationary baffle attached to the non-rotating part and positioned inside the fluid container and immersed in the sealing fluid of the fluid container such that the rotating baffle is free to rotate around the stationary baffle;
- whereby when the rotating process equipment is in operation, the rotating chamber rotates around the stationary baffle and centrifugal forces force the hydraulic sealing fluid to provide the liquid gas seal.

Without being bound to theory, it is believed that adding at least one protruding vane on the inner atmospheric wall increases the surface area and thereby the frictional force that the rotating seal applies to the sealing liquid. This, in turn, increases the circumferential velocity of the fluid imparting a centrifugal force and, thus, generating a higher pressure. By placing these extruded vanes on the low pressure side only, it allows for the maximum sealing force to be created since gas pressure from the process side is counter acted by the higher centrifugal fluid force from the atmospheric side. Similarly, by adding at least one protruding vane on the inner process wall only, atmospheric gases are prevented from entering the rotating equipment. Thus, in the present invention, protruding vanes would be placed on the wall where a higher pressure is desired, i.e., the high pressure sealing side.

It is believed that the hydraulic sealing assembly of the present invention may improve operability, reliability and safety of the machines by:
- reducing their sensitivity to process gas pressure fluctuations;
- increasing maximum sealing pressure
- eliminating uncertainty in sealing water flow rates; and/or
- reducing water leakage which can be a source of bearing contamination.

Other features will become apparent from the following detailed description. It should be understood, however, that the detailed description and the specific embodiments, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

The present invention is directed to a hydraulic sealing assembly for use with any type of rotating machinery where a liquid gas seal is required. The present invention will now be described with reference to a decanter centrifuge as an example of a rotating machinery.

Figure 1:
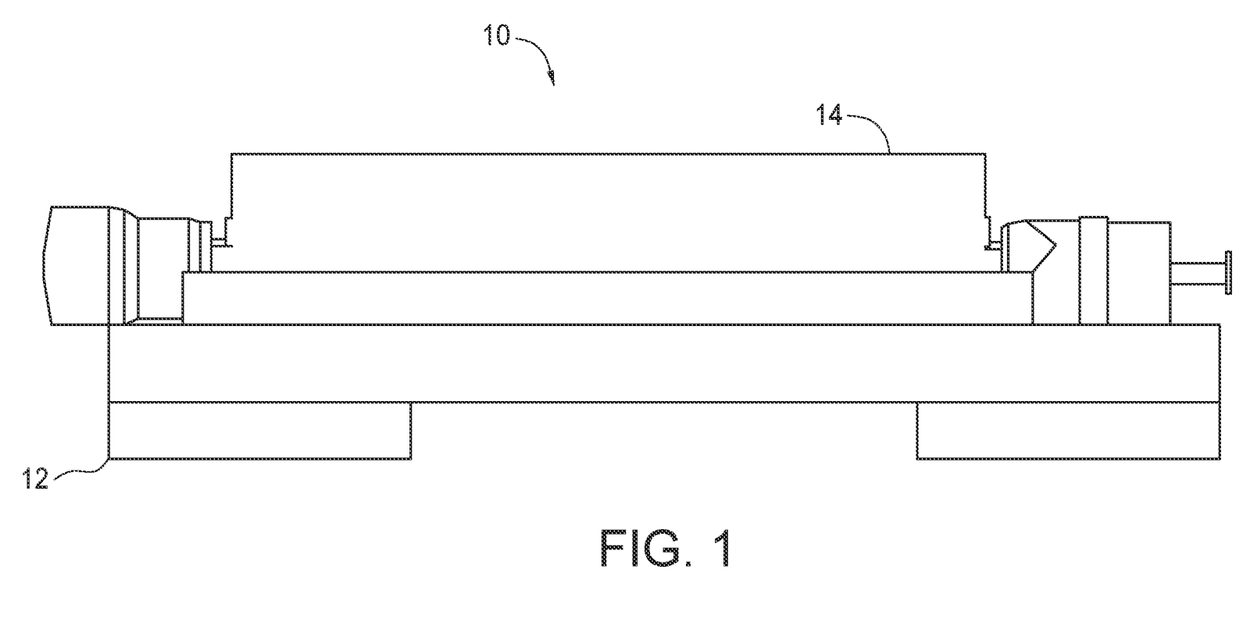
FIG. 1 shows a decanter centrifuge as an example of a rotating process equipment in which a hydraulic sealing assembly of the present invention could be used.

FIG. 1 is a schematic of a decanter centrifuge 10 in its operating state. Decanter centrifuge 10 comprises a frame assembly 12 and a centrifuge cover assembly 14 for encasing the rotating assembly. The sealing assembly of the present invention is used to prevent toxic gases inside of the centrifuge cover assembly 14 from escaping into the atmosphere or, alternatively, atmospheric gas from entering into the centrifuge cover assembly 14. The sealing assembly seals the interfaces between the rotating assembly and the non-rotating frame/cover assemblies of the decanter centrifuge 10.

Figure 2:
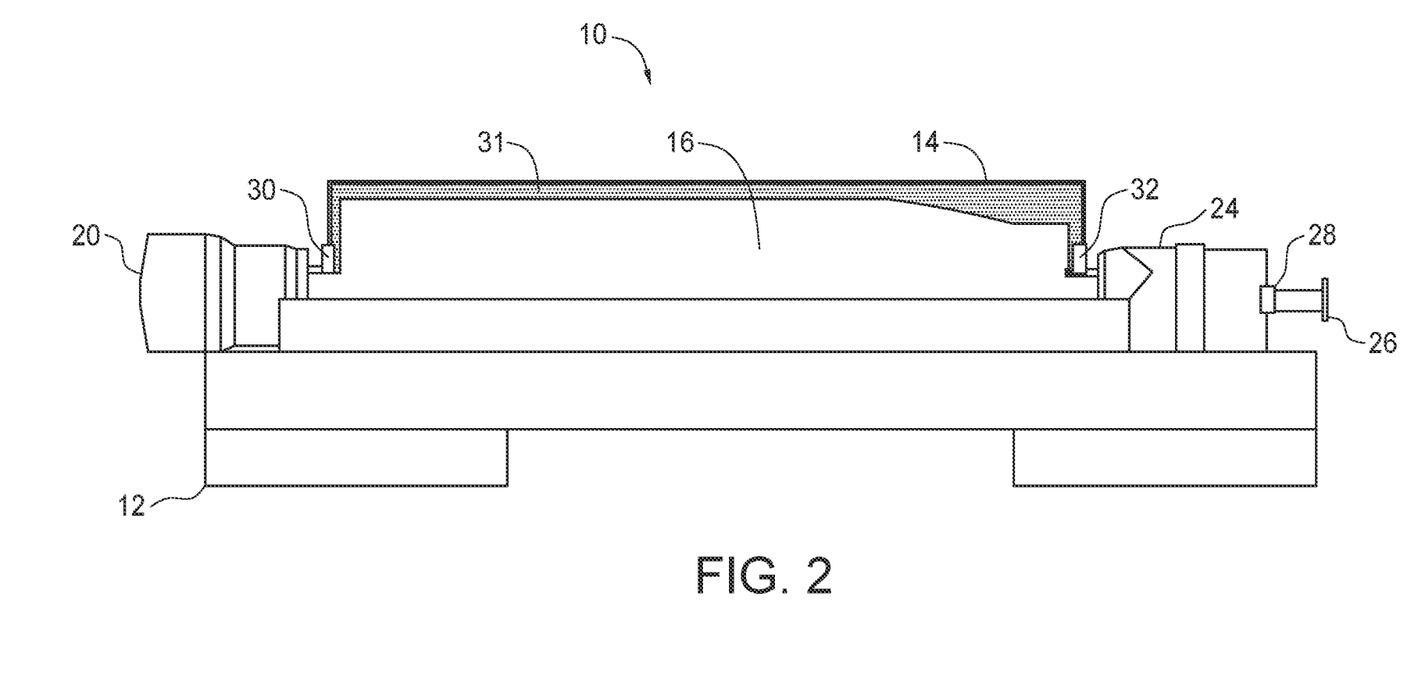
FIG. 2 shows the decanter centrifuge of FIG. 1 with the cover assembly partially removed to show hydraulic sealing assemblies of the present invention.

FIG. 2 shows the decanter centrifuge 10 of FIG. 1 with the centrifuge cover assembly 14 partially removed. With reference now to FIG. 2, decanter centrifuge comprises a rotating assembly 16, which compromises all rotating elements (e.g. the cylindrical/conical bowl, internal screw conveyor, bowl ends) typical for decanter centrifuges. Bearing and differential gear assembly 20 supports the rotating assembly, and controls the differential speed between the bowl and conveyor contained in the rotating assembly 16. The bearing & drive assembly 24 houses the other rotating support bearing as well as the main input drive sheave & feed pipe assembly. Process feed to the centrifuge 10 enters through a stationary feed pipe 26.

As can be seen in FIG. 2, there are generally up to three sealing assemblies; feed pipe hydraulic sealing assembly 28 and two cover hydraulic sealing assemblies 30 and 32. The subject matter of the present invention relates to the novel hydraulic sealing assemblies 28, 30 and 32 that are used to ensure that toxic gas 31, which builds in the space between the rotating assembly 16 and the cover assembly 14, is not released into the atmosphere during use or, in the alternative, that atmospheric gas does not enter the cover assembly 14.

Figure 3:
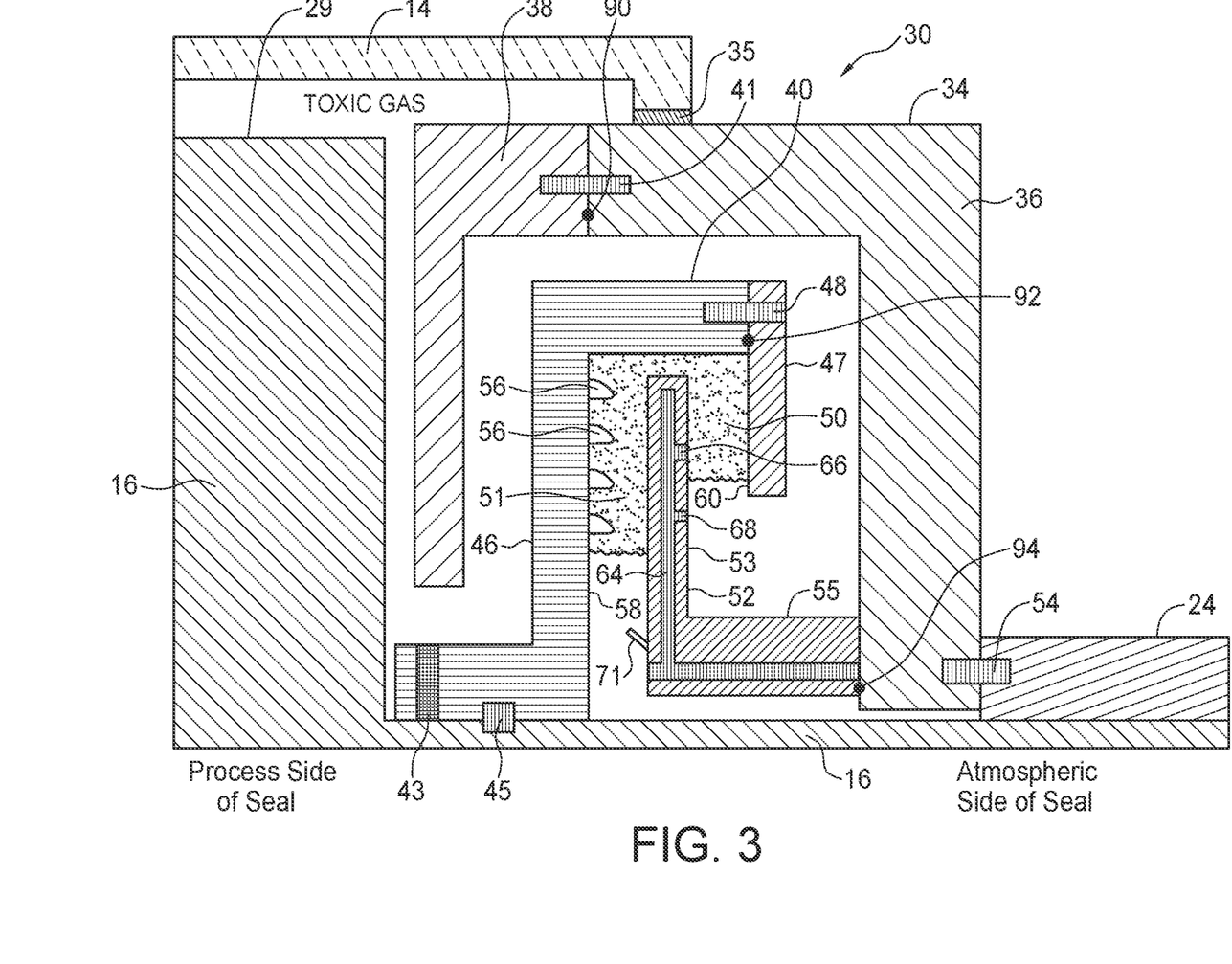
FIG. 3 is a cross-section of an embodiment of a hydraulic sealing assembly of the present invention.

FIG. 3 is a cross section of one embodiment of a hydraulic sealing assembly of the present invention, which, in this embodiment, is present between the rotating assembly 16 and cover assembly 14. Hydraulic sealing assembly 30 comprises a seal housing 34, which consists of an atmospheric cover 36 (i.e., cover which is exposed to the atmosphere) and a process cover 38 (i.e., cover which is exposed to the process side of the of the decanter centrifuge). The two covers 36, 38 are secured to one another by bolts 41, and the joint is statically sealed with an O-ring 90. It is understood that covers 36, 38 can be secured & sealed to one another by other attachment or sealing devises known in the art. For example, the two parts may be threaded together, each part having different ID and OD sizes, such that the two cover parts can be screwed together. In the alternative, the two parts may comprise a snap/compression ring design or a radial pin design. The two covers can also be designed to prevent ingress of contaminates into the seal assembly either from the process streams, sealing fluid, or atmospheric sides that would otherwise impede operation of the seal. For example, this could be done with attachments of radial seals to the covers, incorporating tortuous labyrinth geometry/paths on the cover walls, or with deflector baffles incorporated with the rotating chamber 40.

It is further understood that seal housing 34 can be formed as a single unit; however, it is preferable to manufacture as two separate pieces to facilitate troubleshooting the sealing assembly in the field, i.e., to be able to only remove the atmospheric cover 36 to look inside the sealing assembly. A gasket 35 or other static sealing devices fills the space between cover assembly 14 and seal housing 34.

Housed within seal housing 34 is a rotating chamber 40 that is attached to the decanter rotating assembly 16, by means of a setscrew 43 and O-ring 45 to create a seal at the interface of the bottom of the rotating chamber 40 and rotating assembly 16. Rotating chamber 40 may be comprised of two parts; rotating baffle 46 and weir plate 47, which are attached together by means of bolt 48 with the joint statically sealed with an O-ring 92 or other static method. It is understood that rotating chamber 40 may be manufactured as a single part; however, having two parts provides a means to change the sealing pressure by only changing one part. It also allows for different types of geometries to be used and aids in easier assembly of the seal.

The rotating chamber 40 forms a U-shaped hydraulic sealing fluid chamber 50, where hydraulic sealing fluid can be continuously added. Hydraulic sealing fluid can be water or other suitable sealing fluids. For example, any liquid that that has a higher evaporation point would be beneficial (i.e. silicon oil) since evaporative losses is a big reason why more water must be added. Also, liquids with higher density are beneficial if higher sealing pressure is needed, but seal size is limited. Continuous sealing liquid addition is achieved by internal vanes bored into the stationary baffle 52 (internal channel assemblies 64, described in more detail below) to which an external hose is attached to atmospheric cover 36. Water is fed from the hose into the internals pathways which direct water radially into the rotating hydraulic sealing fluid chamber 50. The atmospheric side of stationary baffle 52 may also comprise baffle vane 71, which will redirect sealing liquid that is "wicked" up stationary baffle 52, back into the rotating pool. This helps prevent sealing liquid loss and leakage from the interaction of the rotating sealing liquid with the stationary baffle 52.

Rotating chamber 40 comprises inner wall 58, which faces the atmospheric side of seal 30 (also referred to herein as atmospheric wall 58), and inner wall 60, which faces the process side of seal 30 (also referred to herein as process wall 60). Attached to atmospheric wall 58 of rotating chamber 40 in this embodiment is at least one protruding vane 56, which protrudes into chamber 50. Thus, the at least one protruding vane 56 is positioned on the atmospheric side of rotating chamber 40 as opposed to the process side of rotating chamber 40, to prevent toxic gas 31, which builds in the space between the rotating assembly 16 and the cover assembly 14, from being released into the atmosphere during use under conditions where the atmospheric side is the low pressure side of the seal. Protruding vanes can be attached to atmospheric wall 58 by means of concentric rings, spiral rings, and the like.

Hydraulic sealing assembly 30 further comprises an L-shaped stationary baffle 52 having a vertical portion 53 and a horizontal portion 55. The vertical portion 53 is positioned inside the hydraulic sealing fluid chamber 50, without contacting any walls of rotating chamber 40, and the horizontal portion 55 is secured and statically sealed (i.e. with an O-ring 94 or other static mechanism) to the inner diameter of atmospheric cover 36, which, in turn, is attached to bearing & drive assembly 24 via bolt 54 or other suitable attachment devices. Thus, when the decanter centrifuge is in operation, i.e., the rotating assembly 16 is rotating, the rotating chamber 40 rotates around stationary baffle 52 and due to the centrifugal force the water builds up a barrier around the stationary baffle 52 to provide a seal between atmospheric and process environments. The addition of protruding vanes 56 on the atmospheric face of the rotating seal wall on the low pressure (atmospheric) side of the seal greatly increases the performance (keeping process gasses out of the atmosphere) of the hydraulic sealing assembly 30.

In one embodiment, hydraulic sealing assembly 30 further comprises internal channel assemblies 64 bored into the stationary baffle 52 to aid in seal operation. Any number of bored channels can be used to meet seal monitoring and performance needs. For example, independent channels could be bored to act as seal pressure/performance monitoring ports. This would involve a bored channel 66 to monitor sealing fluid pressure, and a separate bored channel 58 (e.g. 90 degrees radial offset) to monitor process gas pressure. Pressure gauges could be connected to the bored channels through the atmospheric cover 36 to measure the difference in pressures. If, for example, the sealing fluid pressure and the process gas pressure are nearly the same, the seal needs to be addressed or the seal will fail. This can be addressed by increasing the sealing fluid addition rate or by shutting down the machine for inspection. Furthermore, additional independently bored channels could be added to set up a controlled sealing fluid addition/removal rate from the seal if sealing fluid circulation is desired or actively cooling of the sealing fluid is needed. For example, if there was a need to reduce loss of sealing fluid, or if sealing fluid cannot contaminate the process (since it otherwise overflows rotating weir 47 and will enter the process stream).

Bench testing showed that by installing protruding vanes on the low pressure wall 58, resilience to pressure fluctuations was increased by ~300% compared to when no protruding vanes were present on both the atmospheric wall 58 and process wall 60. Further, total sealing pressure increased from 45 to 77 in-H2O. Also, the present invention showed an improvement of ~70% in resistance to pressure fluctuations compared to when protruding vanes were present on both the atmospheric wall 58 and process wall 60. This highlights the importance of locating the protruding vane(s) on only one chamber wall (58, or 60), depending on where the higher sealing pressure is desired.

Figure 4:
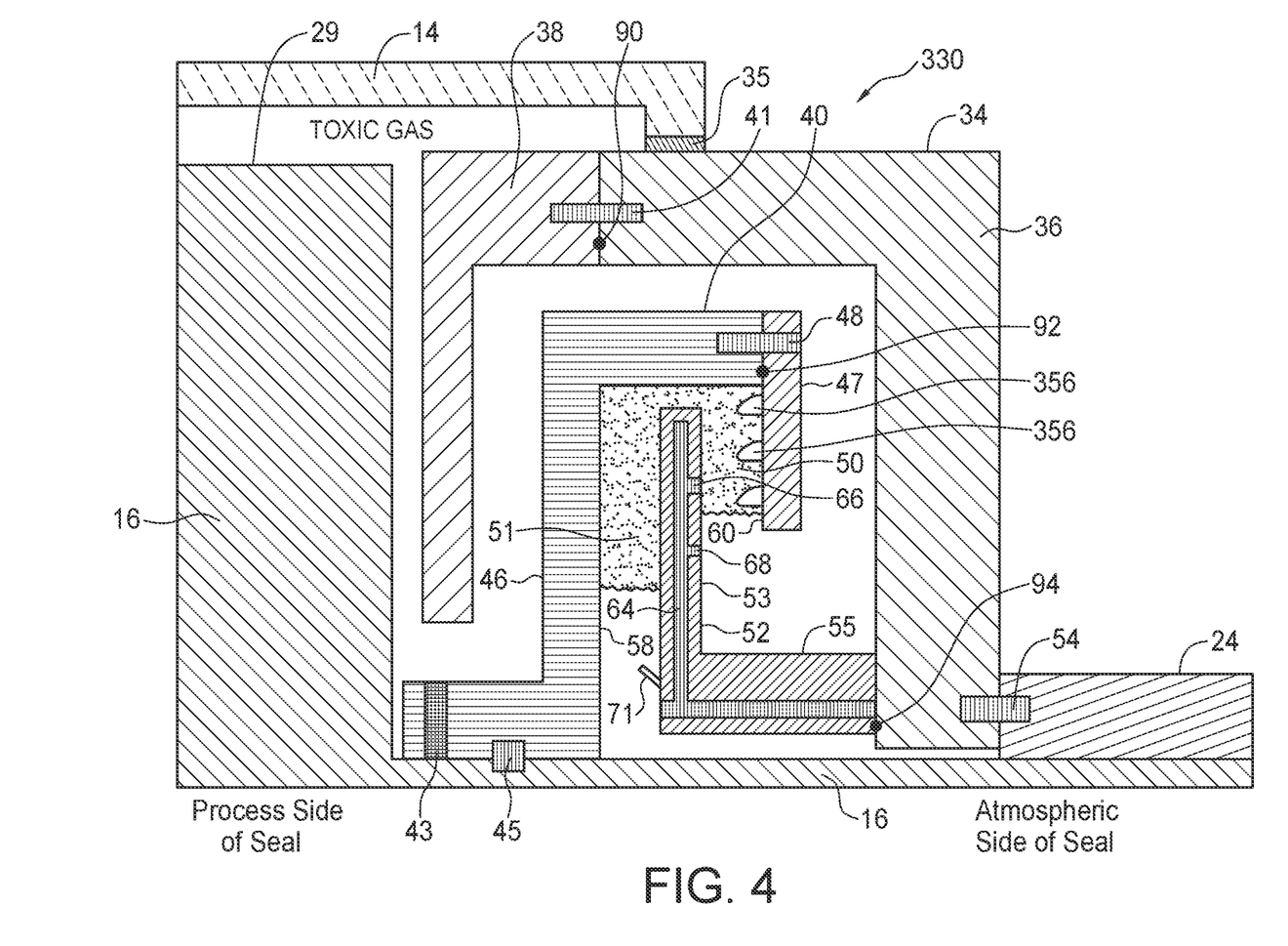
FIG. 4 is a cross-section of another embodiment of a hydraulic sealing assembly of the present invention.

FIG. 4 is a cross section of another embodiment of a hydraulic sealing assembly of the present invention that is present between the rotating assembly 16 and cover assembly 14. In this embodiment, hydraulic sealing assembly 330 can be used to prevent atmospheric gas from entering the cover assembly 14 (and, hence, rotating assembly 16) by creating a higher sealing pressure on the process side of hydraulic sealing assembly 330. In this embodiment, at least one protruding vane 356 is positioned on process wall 60 and protrudes into chamber 50. Thus, the at least one protruding vane 356 is positioned on the process side of rotating chamber 40 as opposed to the atmospheric side of rotating chamber 40. This embodiment may be used when it is desirable to prevent atmospheric gases from entering the cover assembly 14 under conditions where the process side is the low pressure side of the seal. Protruding vanes can be attached to process wall 60 by means of concentric rings, spiral rings, and the like.

Figure 5A:
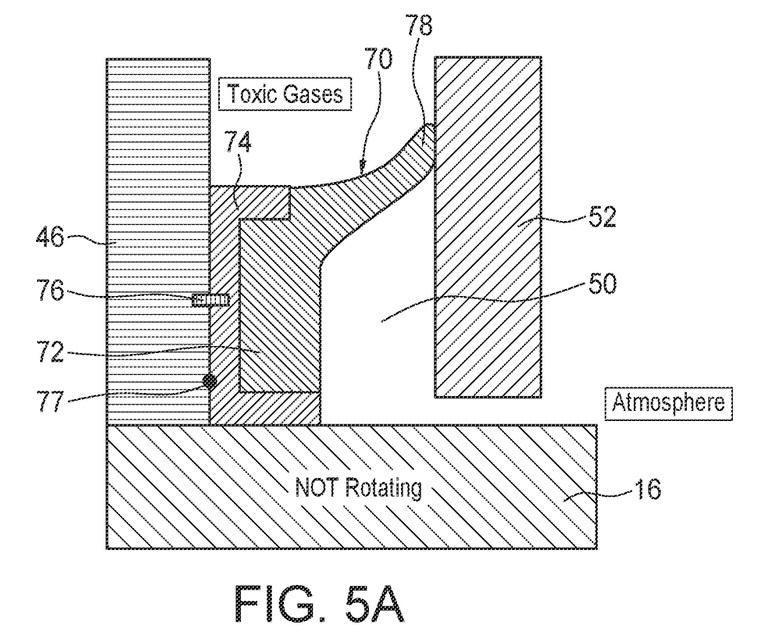
FIGS. 5A and 5B are cross-sections of the inner diameter portion of a hydraulic sealing assembly of the present invention having a secondary sealing member, when the machine is not rotating and rotating, respectively.
Figure 5B:
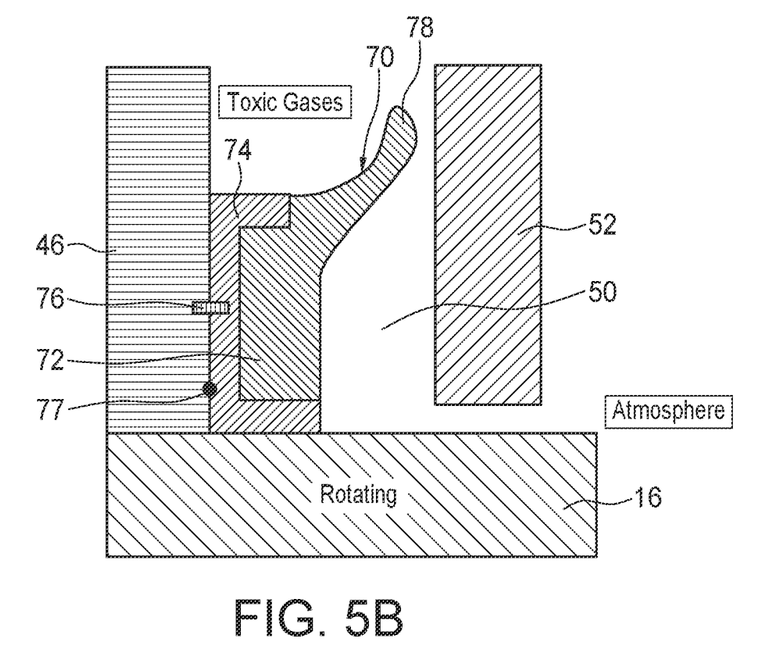
Figure 6A:
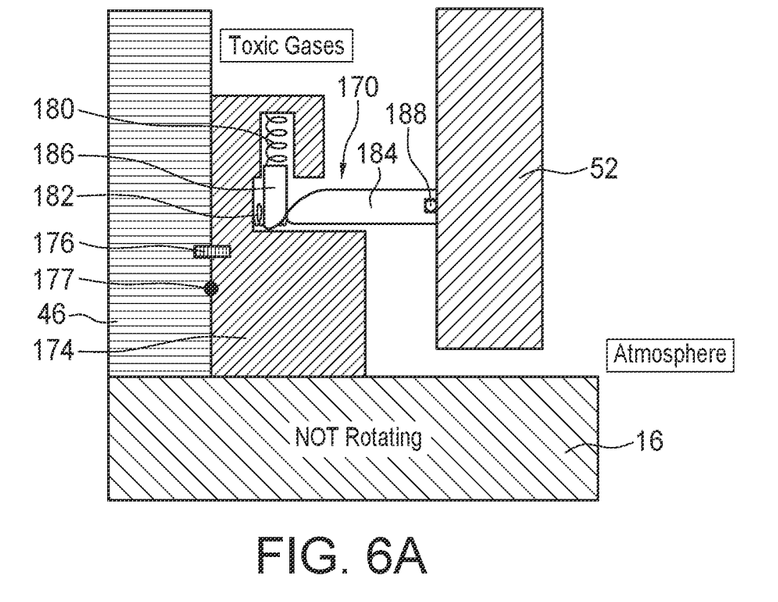
FIGS. 6A and 6B are cross-sections of the inner diameter portion of a hydraulic sealing assembly of the present invention having another embodiment of a secondary sealing member, when the machine is not rotating and rotating, respectively.

With reference now to FIGS. 5A, 5B, 6A, & 6B, in one embodiment, hydraulic sealing assembly 30 or 330 of the present invention can further comprise a centrifugally deactivated sealing member, such as 70 (FIGS. 5A and 5B) or 170 (FIGS. 6A and 6B), which can sealingly engage around the outer surface of the stationary baffle 52 when the rotating baffle 46 slows below a predetermined speed (see FIGS. 5A & 6A). The centrifugally deactivated sealing member is further adapted to disengage from the stationary baffle 52 when the rotating baffle 46 rotates faster than the predetermined speed (FIGS. 5B & 6B), to provide a running clearance between the sealing member 70/170 and the stationary baffle 52. While the hydraulic sealing assembly of the present invention provides a strong seal when the equipment is rotating, the centrifugal hydraulic sealing assembly does not provide a seal once the rotation of the liquid has stopped (i.e., equipment is shut down). Gas leaks may occur as soon as there is no longer enough centrifugal force to hold the sealing liquid in the fluid sealing chamber 50. Current industry practice is to evacuate machine cases of process gas before shut-downs to minimize gas leaks caused by this loss of hydraulic seal. However, eliminating all process gasses this way can be inconsistent, and is difficult to do if the shutdown is emergency or un-planned. Hence, sealing member 70/170 can be used as a secondary seal when the equipment is not rotating.

Turning to FIGS. 5A and 5B, each of which shows only the inner diameter of hydraulic sealing assembly of the present invention, in one embodiment, centrifugally deactivated sealing member 70 comprises a support member 74 and an inner engaging member 72, both of which are annular when the stationary baffle 52 is cylindrical. Inner member 72 is made from a flexible material such as a rubber (Latex, Viton, Burna, EPDM, Nitrile, PTFE, etc.) or even a thin metal/conical spring element.

The sealing member 70 is attached and sealed to rotating baffle 46 via the support member 74 by means of holding pin 76 and O-ring 77. It is understood that other fastening and sealing devices known in the art can also be used. Because inner engaging element 72 is made of a flexible material, a tension is generated and will pull the tip 78 of inner engaging member 72 into contact with the stationary baffle 52 when rotating baffle 46 is not rotating (FIG. 5A). In other words, the inner engaging element 72 is held rigid by the support member 74 and when the rotating baffle 46 is not rotating, the seal can be actuated closed, preventing toxic gases from being released into the atmosphere.

As the rotating baffle 46 starts rotating, holding pin 76 imparts rotational velocity to support member 74 and then to inner engaging member 72. As a specifically designed rotational speed is reached, the tension generated from the inner engaging member 72 due to its material type and dimensions, is overcome by the centrifugal force imparted on the inner engaging member 72 and the tip 78 of inner engaging member 72 is lifted off the outer surface of stationary baffle 52, thereby no longer providing a seal. Since inner engaging member 72 and stationary baffle 52 are no longer in contact, there is no wear of the flexible inner engaging member, which would rapidly deteriorate should it stay in contact with stationary baffle 52 during operation. Once the rotational equipment is in operation, active sealing of the toxic gasses is provided by the hydraulic sealing assembly from the centrifugal force on the sealing fluid.

Figure 6B:
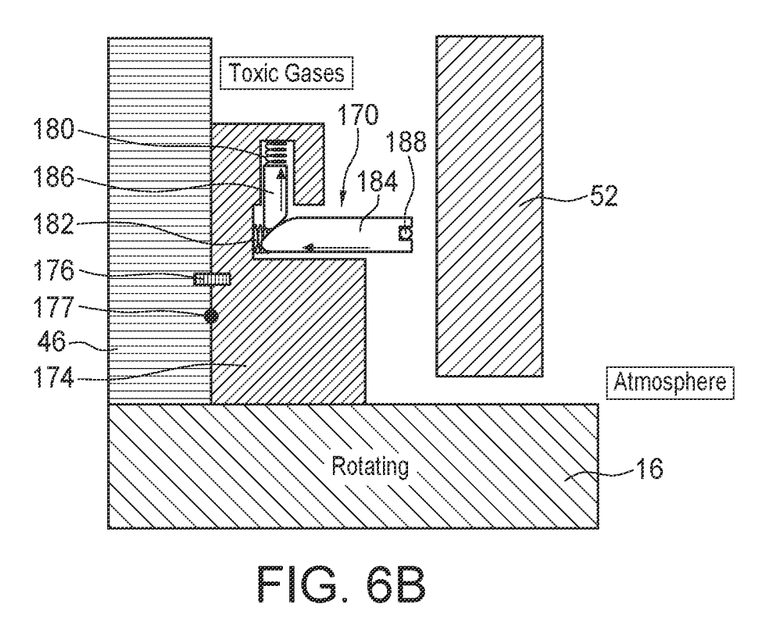

In a similar fashion, sealing member 170 can be used as a secondary seal when the equipment is not rotating. In this embodiment, a spring design sealing member 170 works as follows. With reference now to FIGS. 6A and 6B, when rotating baffle 46 is not rotating (FIG. 6A), compressive force from a series of radial springs 180 force slide actuator 186 radially inward. This engages cam faces on the seal slider 184. Tension from a series of axial springs 182 attached to the seal slider 184 is overcome by the cam forces imparted by radial springs 182, and the seal slider 184 is pushed axially against the stationary baffle 52. Because of the O-ring 188 contained in the seal slider 184, a positive seal can be maintained when the rotating baffle 46 is at rest. Slots & additional O-rings in seal casing 174, which houses springs 180, 182, slide actuator 186 and seal slider 184, would ensure slide actuator 186 and the seal slider 184 stay rigid/on linear paths & also seal the springs/slides from the process.

Seal casing 174 is attached to rotating baffle 46 by means of holding pin 176 and sealed with an O-ring 177. It is understood that other fastening and sealing devices known in the art can also be used. When rotating baffle 46 begins rotating (FIG. 6B), holding pin 176 brings the seal casing 174 up to the rotational velocity. Because of the rotational velocity, a centrifugal force is imparted on the slide actuator 186 which compresses the radial springs 180, moving the slide actuator 186 out of the way. With the slide actuator 186 out of the way, the axial springs 182, which are in tension, pull the seal slider 184 towards the seal case 174, lifting the O-ring 188 off the stationary baffle 52, thus removing the seal.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A hydraulic sealing assembly for providing a liquid gas seal between a rotating part and a non-rotating part of a rotating process equipment, comprising:
   a seal housing having an atmospheric cover and a process cover, each cover manufactured separately and joined to one another by a fastening device and the joint is statically sealed, the seal housing containing:
   (a) a rotating chamber attached to the rotating part, the rotating chamber having an inner atmospheric wall and an inner process wall and forming a fluid container for receiving a hydraulic sealing fluid;
   (b) at least one protruding vane attached to the inner atmospheric wall of the rotating chamber to prevent escape of gases from the rotating process equipment to atmosphere or at least one protruding vane attached to the inner process wall or the rotating chamber to prevent atmospheric gases from entering the rotating process equipment; and
   (c) a stationary baffle attached to the non-rotating part and positioned inside the fluid container and immersed in the sealing fluid of the fluid container such that the rotating chamber is free to rotate around the stationary baffle;
   whereby when the rotating process equipment is in operation, the rotating chamber rotates around the stationary baffle and centrifugal forces force the hydraulic sealing fluid to provide the liquid gas seal.

2. The hydraulic sealing assembly of claim 1, wherein the rotating process equipment is a decanter centrifuge.

3. The hydraulic assembly of claim 1, whereby the rotating chamber comprises a rotating baffle and a weir plate joined to one another by a fastening device including a bolt and the joint is statically sealed with an O-ring.

4. The hydraulic assembly of claim 1, wherein the hydraulic sealing fluid is a liquid having a high evaporation point.

5. The hydraulic assembly of claim 1, wherein the hydraulic sealing fluid is water.

6. The hydraulic assembly of claim 1, wherein the stationary baffle is L-shaped.

7. The hydraulic assembly of claim 1, further comprising internal channel assemblies bored into the stationary baffle for monitoring the sealing fluid pressure and/or process gas pressure.

8. A hydraulic sealing assembly for providing a liquid gas seal between a rotating part and a non-rotating part of a rotating process equipment, comprising:
   a seal housing having an atmospheric cover and a process cover, containing:
   (a) a rotating chamber attached to the rotating part, the rotating chamber having an inner atmospheric wall and an inner process wall and forming a fluid container for receiving a hydraulic sealing fluid, the rotating chamber comprising a rotating baffle and a weir plate joined to one another by a fastening device and the joint is statically sealed;
   (b) at least one protruding vane attached to the inner atmospheric wall of the rotating chamber to prevent escape of gases from the rotating process equipment to atmosphere or at least one protruding vane attached to the inner process wall or the rotating chamber to prevent atmospheric gases from entering the rotating process equipment; and
   (c) a stationary baffle attached to the non-rotating part and positioned inside the fluid container and immersed in the sealing fluid of the fluid container such that the rotating chamber is free to rotate around the stationary baffle;
   whereby when the rotating process equipment is in operation, the rotating chamber rotates around the stationary baffle and centrifugal forces force the hydraulic sealing fluid to provide the liquid gas seal.

9. The hydraulic sealing assembly of claim 8, wherein the rotating process equipment is a decanter centrifuge.

10. The hydraulic assembly of claim 8, wherein the atmospheric cover and the process cover is manufactured as a single piece.

11. The hydraulic assembly of claim 8, wherein the hydraulic sealing fluid is a liquid having a high evaporation point.

12. The hydraulic assembly of claim 8, wherein the hydraulic sealing fluid is water.

13. The hydraulic assembly of claim 8, wherein the stationary baffle is L-shaped.

14. The hydraulic assembly of claim 8, further comprising internal channel assemblies bored into the stationary baffle for monitoring the sealing fluid pressure and/or process gas pressure.

15. A hydraulic sealing assembly for providing a liquid gas seal between a rotating part and a non-rotating part of a rotating process equipment, comprising:

a seal housing having an atmospheric cover and a process cover, containing:

(a) a rotating chamber attached to the rotating part, the rotating chamber having an inner atmospheric wall and an inner process wall and forming a fluid container for receiving a hydraulic sealing fluid;

(b) at least one protruding vane attached to the inner atmospheric wall of the rotating chamber to prevent escape of gases from the rotating process equipment to atmosphere or at least one protruding vane attached to the inner process wall or the rotating chamber to prevent atmospheric gases from entering the rotating process equipment;

(c) a stationary baffle attached to the non-rotating part and positioned inside the fluid container and immersed in the sealing fluid of the fluid container such that the rotating chamber is free to rotate around the stationary baffle; and (d) a centrifugally deactivated sealing member attached to the rotating chamber that can sealingly engage an outer surface of the stationary baffle when the rotating chamber slows below a predetermined speed;

whereby when the rotating process equipment is in operation, the rotating chamber rotates around the stationary baffle and centrifugal forces force the hydraulic sealing fluid to provide the liquid gas seal.

16. The hydraulic assembly of claim 15, wherein the centrifugally deactivated sealing member comprises a support member and an inner engaging member, the support member being attached to the rotating chamber and the inner engaging member being sealingly engaged to the outer surface of the stationary baffle.

17. The hydraulic assembly of claim 16, whereby the inner engaging member is made from a flexible material including a rubber.

18. The hydraulic assembly of claim 17, whereby the support member is attached to the rotating chamber by means of a holding pin and O-ring.

19. The hydraulic assembly of claim 15, wherein the centrifugally deactivated sealing member comprises a series of radial springs, a series of axial springs, and a seal slider that sealingly engages the outer surface of the stationary baffle.

20. The hydraulic sealing assembly of claim 15, wherein the rotating process equipment is a decanter centrifuge.

* * * * *